US008261089B2

(12) United States Patent
Leon Cobos et al.

(10) Patent No.: US 8,261,089 B2
(45) Date of Patent: Sep. 4, 2012

(54) METHOD AND SYSTEM FOR AUTHENTICATING A USER BY MEANS OF A MOBILE DEVICE

(75) Inventors: Juan Jesus Leon Cobos, Tres Cantos (ES); Pedro Celis De La Hoz, Tres Cantos (ES)

(73) Assignee: GMV Soluciones Globales Internet, S.A. (ES)

( * ) Notice: Subject to any disclaimer, the term of this patent is extended or adjusted under 35 U.S.C. 154(b) by 267 days.

(21) Appl. No.: 12/562,111

(22) Filed: Sep. 17, 2009

(65) Prior Publication Data
US 2010/0070759 A1    Mar. 18, 2010

(30) Foreign Application Priority Data
Sep. 17, 2008    (EP) ..................................... 08164499

(51) Int. Cl.
*H04L 9/30*    (2006.01)
(52) U.S. Cl. .............................. 713/185; 713/172; 726/9
(58) Field of Classification Search ........................ None
See application file for complete search history.

(56) References Cited

U.S. PATENT DOCUMENTS
2010/0299731 A1* 11/2010 Atkinson ........................... 726/6

FOREIGN PATENT DOCUMENTS
| JP | 2007-193762 | * | 8/2007 |
| JP | 2007193762 | | 8/2007 |
| WO | WO 2006065002 A1 | | 6/2006 |

OTHER PUBLICATIONS

Shamir, "Identity-Based Cryptosystems and Signature Schemes", 1998, Springer-Verlag, pp. 47-53.*
Bruce Schneier, Two-Factor Authentication: Too Little, Too Late, Communications of the ACM vol. 48, n. 4 (Apr. 2005).
Michiru Tanaka and Yoshimi Teshigawara, A Method and Its Usability for User Authentication by Utilizing a Matrix Code Reader on Mobile Phones, from Information Security Applications, J.K. Lee, O. Yi and M. Yung (Eds.), WISA 2006, LNCS 4298, p. 225-236 (Springer-Verlag 2007).

* cited by examiner

*Primary Examiner* — Minh Dinh
(74) *Attorney, Agent, or Firm* — Fulwider Patton LLP

(57) ABSTRACT

There is provided a method for authenticating a mobile device user against an authenticating system connected to a client computer accessible to said user. The authenticating system uses a communication channel to send to the client computer a logon screen. This logon screen contains a 2D-code embedding, a URL of the authenticating system and a challenge generated by the authenticating system. With a 2D-code reader in the user's mobile device the URL and the challenge are decoded. The user then inputs a password and a response to the challenge is computed. The response is sent together with the user ID to the authenticating system. The authenticating system is able to ascertain that the response to the challenge necessarily comes from the user thereby verifying his identity. Once the user is authenticated, the authenticating system pushes to the client computer (identified by the challenge) a welcome screen.

11 Claims, 1 Drawing Sheet

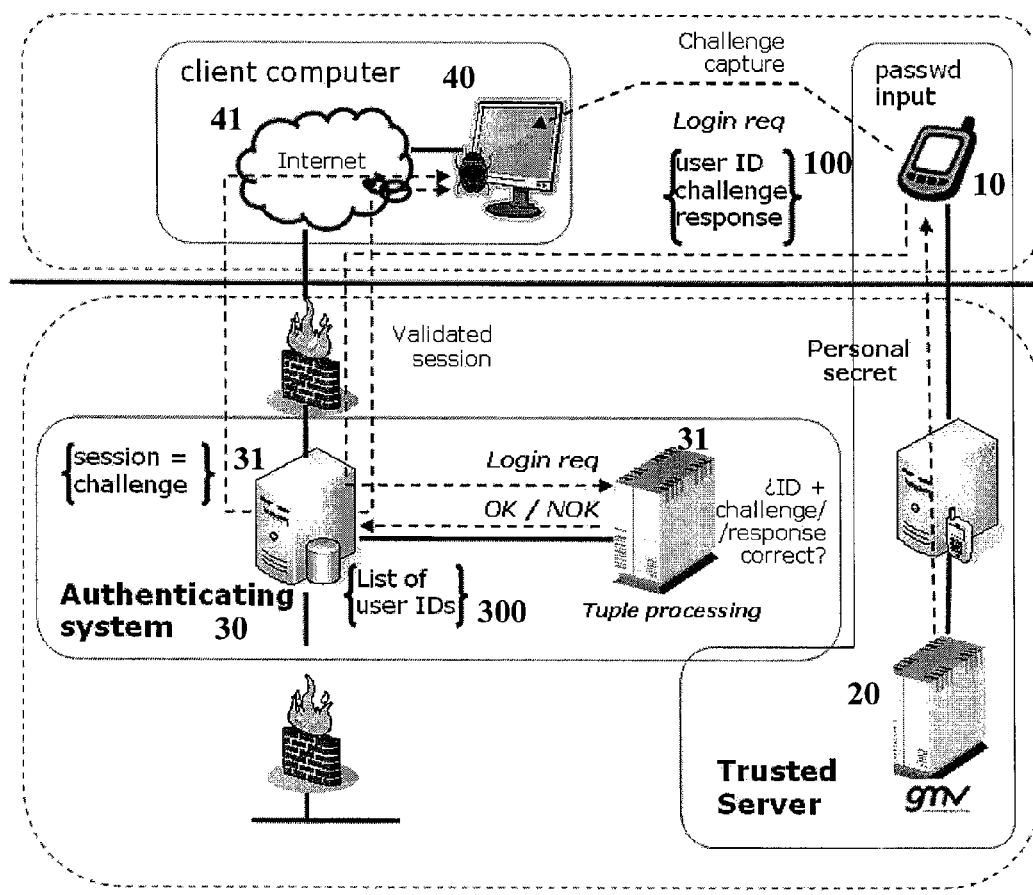

METHOD AND SYSTEM FOR AUTHENTICATING A USER BY MEANS OF A MOBILE DEVICE

FIELD OF THE INVENTION

The present invention is related to authentication mechanisms, more specifically referring to an authentication mechanism that uses a mobile device.

BACKGROUND OF THE INVENTION

FIPS Publication 200 defines Authentication as "verifying the identity of a user, process, or device, often as a prerequisite to allowing access to resources in an information system". The entity to be positively identified and verified is usually called a "Principal" in the literature, although this convention will be simplified and throughout the text the term "user" is used. The system in charge of verifying the identity is usually called the "authenticating system". The computer that is used to access the authenticating system is called the "client computer".

Authentication has traditionally imposed great challenges to the computer science and security industries, and a number of mechanisms have been proposed to ensure efficient and secure authentication. Amongst the relevant risks related to user authentication, the most obvious are the following two:
   The first and obvious risk is unauthorized access. If the method used for authentication is vulnerable to attack, an unauthorized person might gain fraudulent access to a system by pretending to be a different user. It is therefore important that the authentication method is reliable, in the sense that it makes it extremely difficult for an attacker to pretend to be someone else.
   A further risk is identity theft. If the method used for authentication establishes the identity of the user by means of some credentials (usually some information in the form of keys or passwords in the context of a cryptographic system), then the security of these credentials is crucial to the security of the system. It is often the case that a user authenticates in different systems using the same credentials. In case that an authenticating system is vulnerable or that the user is led to authenticate to a malicious system, the credentials might be exposed and stolen, therefore compromising the security of all other authenticating systems. Identity theft is therefore a more general risk, in the sense that allows unauthorized access to systems even if the authenticating method is reliable and does not have a known vulnerability.

Since the invention of the simple and well known user-password mechanism, several techniques have been proposed so far to increase the reliability of authentication methods:
   Strong authentication is defined by the U.S. Government's National Information Assurance Glossary as a layered authentication approach relying on two or more authenticators to establish the identity. This is also called two-factor authentication, since it involves two authenticators like for instance something you know, say a password, and something you have, say a token.
   Most solutions employ cryptography to ensure that credentials can be verified without compromising their security (e.g. using Public Key Cryptography or One-Time-Password generators). Essentially, authentication relies on a secret that is not interchanged in the authentication protocol. For instance, instead of providing a password, the user computes a response to a challenge using the password and communicates the response, and never the password.
   Another recently proposed technique, called two-channel authentication, improves security by using two different communication paths (for instance, a bank may phone-call a user to verify access). The first channel is the channel from client computer to authenticating system, and the second channel is in this case the telephone line.

The above mentioned techniques mitigate the existing risks but are unable to face in an efficient way the newest threats like Man-In-The-Middle or Trojan attacks (see, for instance, *Communications of the ACM* vol 48, n 4, Apr. 2005, Inside Risks 178 by Bruce Schneier). This results, among others, in increasing fraudulent transactions in online banking or unauthorised remote user access to enterprise systems.

This situation is explained because the current authentication scenario has evolved in the recent years and is now characterised by two new facts:
   The authenticating systems are not secure. Even more, some authenticating systems might be malicious in nature. Therefore, all information that is stored in these systems could be misused and all authenticating systems must be regarded as untrusted.
   The evolution of malicious software (like Trojans) and the proliferation of Internet access have rendered our client computers insecure as well. For instance, our home PC that we use to access online banking cannot be trusted, since the presence of Trojans is becoming more common every day. The Trojan will recognize the user authentication process and will either capture user credentials or impersonate the user to perform fraudulent transactions. Therefore, our client computer must also be regarded as untrusted.

As a result, the need arises for a method of authentication that not only provides strong authentication and does not require secret exchange, but also regards both the authenticating system and the client computer as untrusted. Specifically, an authenticating method is required that enjoys the following features:
   Stores no authentication information at all in the authenticating system.
   Does not interact with the client computer during the authentication process.

The following background technologies are relevant to the present invention and are therefore introduced next for convenience:
   An Identity Based Encryption (IBE) scheme is a public key encryption scheme in which the public key of a user is some unique and public information about the identity of the user. This public key can be an arbitrary string, and it allows any party to generate a public key from a known identity value such as an ASCII string. A trusted third party, called the Private Key Generator (PKG) generates the corresponding private keys. To operate, the PKG first generates a master public key, and retains the corresponding master private key (referred to as master key). Given the master public key, any party can compute a public key corresponding to the identity ID by combining the master public key with the identity value. To obtain a corresponding private key, the party authorized to use the identity ID contacts the PKG, which uses the master private key to generate the private key for identity ID. This scheme particularly allows the creation of digital signatures that can be verified by anyone without previous distribution and storage of a public key, since the public key can be generated from the public identity of the signer. The scheme may be conveniently implemented using Elliptic Curve Cryptography and bilinear pairings, like for instance the Weil pairing or the Tate pairing.

Two-dimensional barcodes are graphical representations (images) of data in form of dots, bars, or other shapes following predefined patterns. Their definition includes the rules that are necessary to encode/decode data into/from the images (this is called their symbolism). These barcodes are designed so that a mobile device provided with a camera can easily capture the image and decode its contents.

Push technology is used as a generic term to refer to all methods by which a server computer can send information to a client computer without the previous request from the client computer. Depending on the architecture of the system that communicates the authenticating system with the client computer, push will be implemented by means of adequate technologies like http streaming, Java pushlets or long polling.

SUMMARY OF THE INVENTION

The invention refers to a method and a system for authenticating a user of a mobile device according to claims 1 and 9, respectively. Preferred embodiments of the method and the system are defined in the dependent claims.

A first aspect of the present invention relates to a method for authenticating a user of a mobile device against a remote authenticating system which is connected to at least a client computer accessible to said user, which comprises:
- i—reading a 2D-code displayed to the client computer by means of a 2D-code reader provided in said mobile device, wherein at least a URL address of the authenticating system and a codified challenge generated by authenticating system are embedded in said 2D-code;
- ii—processing said codified challenge and computing a response to the challenge using a personal secret, said personal secret being a string of characters univocally related to a user identifier—user ID—of said user of the mobile device and to a time stamp;
- iii—sending a message to the authenticating system, said message including a tuple whose elements are at least said user identifier, said challenge and said response to the challenge;
- iv—analyzing said elements of the tuple and determining the tuple is a valid tuple if it can be guaranteed that the response to the challenge has been generated using the personal secret of the user whose user identifier is in the tuple for a given period of time, and in case said tuple is valid:
- v—looking up in a users list stored in the authenticating system to see if the user identifier in the tuple is in said users list, and if the user identifier is in the users list, it is verified if the challenge in the tuple is in a session list stored in the authenticating system, and if the challenge is in the session list, the authenticating system pushes a welcome screen to the client computer that corresponds to a session identification number in the session list where the challenge is.

Said 2D-code can be any graphical representation of data following a predetermined shape, which can be read and decoded with a 2D-code reader.

Preferably the 2D-code reader is a camera.

Said personal secret is preferably stored in the mobile device and accessed upon entering a password.

The step of processing said codified challenge and computing a response preferably comprises:

requesting the user of the mobile device to enter a password in order to access a personal secret stored in the mobile device;

upon entering said password, retrieving said personal secret;

computing a response to the challenge embedded in the 2D-code using said personal secret.

The response to the challenge can be computed using a digital signature algorithm according to an Identity Based Encryption scheme, such that the validity of said signature can be afterwards verified for any given date and any given user identifier using only publicly available information related to said scheme.

Preferably, said personal secret is securely provided by a trusted server, which computes said personal secret using a master secret and said user identifier and said time stamp.

It is possible also that the personal secret is computed in a sequence of steps and data interchanges between the trusted server and the mobile device.

The step of analyzing the elements of the tuple is carried out by the authenticating system and performed using public cryptographic primitives.

Thus, the authenticating method of the present invention is to be used to authenticate (i.e. positively identify) a security principal, typically—but not necessarily—a human user that is the owner of the mobile device. The principal is authenticated against a computer-based system, like for instance a web server, a self service kiosk, an Automatic Teller Machine (ATM), a remote network, etc.

The authentication relies on two factors, a mobile device owned by the user and a personal secret only accessible by a password (or secret) that the user knows. Both are needed for authentication. Therefore, it is a strong authentication mechanism. Also, the personal secret is never stored in any authenticating system; it is only input to the mobile device. These are usual requirements for an authentication method. But additionally, the proposed method has two distinct and innovative features:

- The authenticating system is regarded as untrusted. Consequently, no authentication information is stored in the authenticating system. Only the user identifier (e.g. his name, login or similar identity information) needs to be stored for authorisation purposes. Essentially, the authenticating system can be regarded as completely untrusted without loss of security.
- The authenticating system is accessed by the user using a local client computer, which is also regarded as untrusted. Once the user is faced with an authentication (or logon) screen visible in a client computer, the client computer does not participate in the authentication process (specifically, the client computer is not even touched by the user). The authentication takes place in another channel, accessed by the mobile device, which is completely unrelated to the client computer. After successful authentication, it is the authenticating system that pushes the authenticated page (or welcome screen) to the client computer. Therefore, it is not a "two-channel" authentication method, but a "different channel" authentication method.

The fact that both the authenticating system and the client computer are regarded as untrusted largely mitigates the current risks associated with the authentication process.

The drawbacks described in the previous section are largely mitigated by means of method of the present invention which:

provides strong authentication based on two factor (mobile device and password);

keeps the password secure, particularly the password is never exchanged or stored in any untrusted system;

does not require the authenticating system to store any user-related information, since the response to the challenge contains all the information necessary to verify the identity of the user; and carries out the whole authentication process without the user interacting with his (untrusted) client computer. Note that a possible Trojan in the client computer cannot know when a picture of its screen is taken and cannot recognize the welcome screen that is pushed from the authenticating system as an authenticated screen.

Also, a distinguishing feature of the present invention is that the authenticating system does not need to communicate on-line with any other system in order to authenticate the user. It is therefore a stand-alone system.

A second aspect of the present invention relates to a system for authenticating a user of a mobile device against a remote authenticating system which is connected to at least a client computer accessible to said user, which comprises:

a 2D-code reader in said mobile device for reading a 2D-code, wherein at least a URL address of the authenticating system and a codified challenge generated by authenticating system are embedded in said 2D-code;

processing means in said mobile device for processing said codified challenge and computing a response to the challenge using a personal secret; wherein said personal secret is a string of characters univocally related to a user identifier (user ID) of said user of the mobile device and to a time stamp;

communication means between said mobile device and the authenticating system configured to, upon computing said response, send a message to the authenticating system, said message including a tuple whose elements are at least said user identifier, said challenge and said response to the challenge;

processing means in the authenticating system configured to analyze said elements of the tuple and determining the tuple is a valid tuple when the response to the challenge has been generated using the personal secret of the user whose user identifier is in the tuple for a given period of time, and in case said tuple is valid the processing means are configured to:

i—check in a users list stored in the authenticating system if the user identifier in the tuple is in said user list, and if the user identifier is in the users list the processing means are configured to:

ii—verify if the challenge in the tuple is in a session list stored in the authenticating system, and if the challenge is in the session list:

iii—the authenticating system is configured to push a welcome screen to the client computer that corresponds to a session identification number in the session list where the challenge is.

The advantages of the proposed invention will become apparent in the description that follows.

BRIEF DESCRIPTION OF THE DRAWINGS

To complete the description and in order to provide for a better understanding of the invention, a drawing is provided. The drawing forms an integral part of the description and illustrate the preferred embodiments of the invention, which should not be interpreted as restricting the scope of the invention, but just as an example of how the invention can be embodied.

The drawing comprises FIG. 1, which shows an authentication scheme according to a preferred embodiment of the invention.

DETAILED DESCRIPTION OF THE PREFERRED EMBODIMENTS

The authentication method of the present invention works on top of a specific authentication architecture, which is shown in FIG. 1. The elements of this architecture are the following:

MOBILE DEVICE 10: The first element is a mobile device that hosts a mobile application (which will be described in detail further below). The mobile device provides four distinct features:

a. Secure storage capability.

b. Secure communications capability with a Trusted Server 20 (this server is also further described below).

c. Wireless communication capability with an authenticating system 30 (also further described below). This communication capability will be typically available via wireless Internet, and the related communication channel does not need to be secured.

d. A built-in camera that can be accessed from the mobile application.

Every mobile device in the architecture is directly and univocally associated with a user that will be authenticated. This user in turn is associated with a user name or 'user ID' that is public and recognizable by the authenticating system. This 'user ID' might for instance be the user's name, the user's email address or a user's mobile identifier (IMEI, IMSI, MSISDN). It just needs to be unique and public.

The secure storage capability is used to store in the mobile device a so called personal secret. The fact that the storage is secure means that a password is required to retrieve this secret by any mobile application, and without this password it is computationally unfeasible to retrieve this secret.

MOBILE APPLICATION: a mobile application runs inside the mobile device. This application might be built into the mobile device or might be loaded from a server. The application has three basic functions:

1. Capturing an image containing a two-dimensional barcode (also called visual tag) and decoding its content. The capture is performed accessing the device camera. The image is decoded to obtain the barcode content. The content is a string of characters that includes two pieces of information: a URL and a codified challenge.

2. Processing the codified challenge and computing a valid response. The challenge takes the usual form of a string of characters containing a very large number. In order to compute the response, the user is requested a password that the mobile device uses to access and decrypt a securely stored personal secret. This personal secret is in turn used by the mobile application to compute a short digital signature of the challenge, and this signature constitutes the response. The signature is computed according to an Identity Based Encryption (IBE) scheme. The computation of the signature is performed using IBE cryptographic primitives that guarantee that it is computationally infeasible to compute a valid response to any given challenge consistent with a given user ID without the knowledge of the personal secret linked to that user ID.

The personal secret was computed by the IBE PKG from an identity value derived from the user ID and a date (preferably, the current date), so that any party that knows this user ID and date is able to verify the validity of the signature without further information (other than the public information that defines the IBE scheme). The secret is securely stored in the mobile device, and access to the secret is protected by the mentioned password, without which it is computationally infeasible to retrieve.

3. Sending a message to a server 31 in the authenticating system via the wireless channel, typically via the Internet. The address of the authenticating server is contained in the URL that was included in the captured image. The message that is sent is specifically a tuple 100 that includes three values (i.e. pieces of information):
   a. The user ID
   b. The challenge
   c. The response TRUSTED SERVER 20: the purpose of the Trusted Server is to manage the creation and distribution of personal secrets to users (to their mobile devices).

The trusted server must provide a built-in secure communication channel to all mobile devices. In this context, secure means encrypted and authenticated. The existence and security of this communication channel is taken for granted. On the other hand, this channel does not need to be permanently active, it will only be used in the secret distribution phase (see below).

The Trusted Server securely stores (or otherwise has secure access to) a so called Master Secret. This Master Secret is accessed by a software program called the secrets computation software.

SECRETS COMPUTATION SOFTWARE: it is a software program that runs in the Trusted Server. This program receives as input a user ID and a date (preferably the current date) and, using the Master Secret, computes a personal secret valid for that user and a particular period of time (for instance, the day that corresponds to that particular date) according to IBE cryptographic primitives. Furthermore, the component is able to send this personal secret to the mobile application that runs on the device that belongs to that particular user, using the Trusted Server built-in secure communication channel to the device. The Secrets Computation Software takes the role of the IBE PKG.

It is possible also that the personal secret is computed in a sequence of steps and data interchanges between the Trusted Server and the mobile application. In this more general case the personal secret is thus computed in a distributed fashion between the secrets computation component and the mobile application.

In any case, two conditions always hold:
1. The personal secret of a user is univocally linked to the user ID and a particular date, in the sense that, for a given Master Secret, a personal secret can only correspond to one user ID and one date.
2. The personal secret cannot feasibly be computed without the Master Secret CLIENT COMPUTER 40: this may be a personal PC, a kiosk, an ATM, etc, which is physically located where the user is. The client computer features a screen, capable of presenting a graphical user interface, and this screen is visible by the user, so that the user can easily take a photograph of the screen using the camera that is embedded in his/her mobile device. When the user wants to authenticate himself/herself, he/she stands in front of the client computer.

AUTHENTICATING SYSTEM 30: it is in charge of actually authenticating the users. This system will actually be implemented as an authenticating server 31, or network of servers or computers, acting in a coordinated fashion. It could even be the same client computer. In case that the system is physically separated from the client computer, it must have access to a (possibly untrusted) communication link with one or more client computers (usually the Internet 41, or may be some company's internal network).

This authenticating system performs the following four functions:
a. It serves the so called "login pages" (or "login screens"). This means that the authenticating system is capable of generating and sending to the client computer a graphical interface that possesses the following properties:
   i—It includes a two-dimensional barcode that embeds the URL of the authenticating system and a securely random challenge of a given number of bits.
   ii—It tracks the client computers where it is serving login pages by means of the challenge that it has sent, using this challenge as a session identification number. The system stores the session identification number in a session list. In this way, the system knows which client computer corresponds to every challenge that it has generated. The session identification number for any client computer is identical to the last challenge sent to that client computer embedded in the login page or screen.
   iii—At any given time, if the client computer requests another login page, a new random challenge is generated, the login page is served and the session list is updated with the new challenge (i.e. the new session identification number), rendering the previous one invalid.
In the particular case that the client computer is a personal PC that hosts an Internet browser, then this function is a web server function, and the served interface takes the form of an HTML page that includes an embedded image with the two-dimensional barcode.
b. It listens to and receives tuples that are sent by mobile devices over their wireless communication channels. Typically the wireless channel will be a wireless access to the Internet, and in this case the system receives the tuples via the Internet.
c. It processes tuples. Tuple processing is defined as analyzing the three elements of every tuple {user ID, challenge and response} and returning OK or NOK. The process shall take as input the three values in the tuple and one or possibly more input dates (typically just one date, the current date). The process shall return OK whenever the tuple is a valid tuple, and shall return NOK in any other case. A valid tuple is defined as a tuple where the response to the challenge is guaranteed to be generated using the personal secret that corresponds to the user whose user ID is in the tuple for any of the periods related to the input dates. The tuple processing function is performed using public cryptographic primitives which are assumed might be known by anyone. This function is performed by a software program that includes (or accesses) no secrets.
d. It pushes "welcome pages" (or "welcome screens"). A welcome page is defined as the first page (or screen) that every user sees in the client computer after he/she has successfully authenticated. From this page the user shall be able to access the system according to his/her authorized roles. This means that the system has the capability to identify, for any given challenge, the client computer where it served the login page that included that challenge and subsequently send (under its own initiative) the welcome page of an authenticated session to that particular client computer. In the particular case that the client computer is a personal PC that hosts an Internet browser, the push capability consists in the capability to push an HTML page to this browser.

These four functions are implemented by means of a number of distributed and coordinated computer programs.

In addition, the authenticating system stores a user list 300. This list contains the user IDs of all users that are authorized to access the system, and possibly other further information that the system might use to customize the welcome page of every user.

If the system to which the user authenticates requires any other function to be performed for authentication (for instance, storing some information in a directory, starting some auditing process, etc), then this function is also performed by the authenticating system.

None of the previously described functions of the authenticating system requires access to any other external system. i.e., only the functions above described are required for authentication.

The authenticating method of the present invention can work using any type of 2D-barcode that is designed so that reading and decoding is feasible and efficient using the camera and the computer power available in a mobile device. Examples of these types are Datamatrix, QR code or Semacode.

The authentication method of the present invention consists of three phases:

SETUP: during this Setup phase the Master Secret is generated and all components described above are installed and all applications started. This is done only once.

SECRET DISTRIBUTION: the purpose of the Secret distribution phase is to compute and distribute all personal secrets to every user mobile device. This phase is run periodically (for instance, once a day). The personal secret that is distributed is computed using the current system date of the Trusted Server and is defined to be valid for a period of time whose length coincides with the period of the secret computation. For instance, if this phase is run once a day, then all personal secrets are valid for one day; if this phase is run once a week, then all personal secrets are valid for one week.

AUTHENTICATION: the Authentication phase is the actual authentication of the user against the authenticating system. This phase is a process that takes place in the following steps:

1) The user accesses the client computer and requests a login screen.
2) The authenticating system serves a login screen that includes a two-dimensional barcode.
3) The user starts the mobile application in his/her mobile device.
4) The user uses the mobile application to take a picture of the 2D-barcode in the screen of the client computer.
5) The mobile application requests the user a password in order to access the personal secret stored in the device.
6) The user inputs the password and the mobile application retrieves the personal secret.
7) The mobile application computes the response that corresponds to the challenge embedded in the barcode, using the personal secret.
8) The mobile application sends via wireless communication the tuple {user ID, challenge, response} to the URL that was embedded in the barcode.
9) The authenticating system receives the tuple.
10) The authenticating system processes the tuple.
11) If NOK is returned, the tuple is not valid and the authentication process fails and ends.
12) If OK is returned, the tuple is valid and the user is authenticated, meaning that the authenticating system trusts that the tuple is coming from the user that corresponds to the user ID. However, in order to provide access to the user, the process still has to further proceed as follows.
13) The authentication system looks up in its user list to see if the user ID that comes with the tuple is in the list.
14) If the user ID is not in the list, the user is assumed not to be authorized to access, the process fails and ends.
15) If the user ID is in the list, the authenticating system looks up for challenge in the tuple in the session list. If the challenge that came with the tuple is not in the session list, the process fails and ends.
16) If the challenge is in the session list, the authenticating system pushes the welcome screen to the client computer that corresponds to the session identification number (possibly a personalized welcome screen for the user ID). The process has finished successfully.

Push technology is used because in the described mechanism the initiative to replace the login screen by an authenticated screen (and the initial session by an authenticated session) comes from the authenticating system, and not from the client computer. In a typical client-server architecture, this just requires a particular software implementation. In a web-based architecture, a specific push mechanism needs to be used. This mechanism will usually be implemented by means of adequate technologies like http streaming, Java pushlets or long polling.

According to the preferred embodiment, the authenticating system uses a regular communication channel to send to the client computer a logon screen. This screen contains a two-dimensional barcode which contains information on the URL of the authenticating system and, most remarkably, a random challenge (a random number used only once, or "nonce") generated by the authenticating system. The user, which preferably stands in front of the client computer, does not need to use the client computer keyboard or mouse, but just needs to capture the image with the camera featured by his/her mobile device and decode the URL and the challenge. The user then inputs a password to the mobile device and as consequence, a response to this challenge is computed. This response cannot be computed by any other device other than the user's, and cannot be computed without the user's password. Once computed, the response is sent, together with the user's identity, to the authenticating system URL via a channel established ad-hoc from the mobile device. The authenticating system is able to ascertain that the response to the random challenge necessarily comes from the user therefore verifying his identity. In order to close the loop, the authenticating system finally pushes to the client computer (identified by the random challenge) an authenticated "welcome" screen, to allow the user to continue his interaction with the system by means of the client computer.

The authentication method as described before provides strong authentication, in the sense that passwords or other credentials are never interchanged between the user and the authenticating system. On the other hand, the authenticating system does not need to store any user-related information at all for the purpose of authentication, although it is required to store user's IDs for authorization purposes.

The invention is obviously not limited to the specific embodiments described herein, but also encompasses any variations that may be considered by any person skilled in the art (for example, as regards the choice of components, configuration, etc.), within the general scope of the invention as defined in the appended claims.

We claim:

1. Method for authenticating a user of a mobile device against a remote authenticating system which is connected to at least a client computer accessible to said user, which comprises:
   i. reading a 2D-code displayed to the client computer by means of a 2D-code reader provided in said mobile device, wherein at least a URL address of the authenticating system and a codified challenge generated by authenticating system are embedded in said 2D-code;
   ii. processing said codified challenge and computing a response to the challenge using a personal secret, said personal secret being a string of characters univocally related to a user identifier (user ID) of said user of the mobile device and to a time stamp, said response to the challenge is computed using a digital signature algorithm according to an Identity Based Encryption scheme;
   iii. sending a message to the authenticating system, said message including a tuple whose elements are at least said user identifier, said challenge and said response to the challenge;
   iv. analyzing said elements of the tuple and determining the tuple is a valid tuple, when the response to the challenge has been generated using the personal secret of the user whose user identifier is in the tuple for a given period of time, and in case said tuple is valid;
   v. looking up in a users list stored in the authenticating system to see if the user identifier in the tuple is in said user list, and if the user identifier is in the users list, verifying if the challenge in the tuple is in a session list stored in the authenticating system, and if the challenge is in the session list, the authenticating system pushes a welcome screen to the client computer that corresponds to a session identification number in the session list where the challenge is.

2. Method according to claim 1, wherein said personal secret is stored in the mobile device and accessed upon entering a password.

3. Method according to claim 1, wherein the step of processing said codified challenge and computing a response comprises:
   requesting the user of the mobile device to enter a password in order to access a personal secret stored in the mobile device;
   upon entering said password, retrieving said personal secret;
   computing a response to the challenge embedded in the 2D-code using said personal secret.

4. Method according to claim 1, wherein said personal secret is provided by a trusted server, which computes said personal secret using a master secret and said user identifier and said time stamp.

5. Method according to claim 1, wherein the step of analyzing the elements of the tuple is carried out by the authenticating system and performed using public cryptographic primitives.

6. Method according to claim 1, wherein said 2D-code reader is a camera.

7. Method according to claim 1, wherein said 2D-code is any graphical representation of data following a predetermined shape, and which can be read and decoded with a 2D-code reader.

8. System for authenticating a user of a mobile device against a remote authenticating system which is connected to at least a client computer accessible to said user, which comprises:
   a 2D-code reader in said mobile device for reading a 2D-code, wherein at least a URL address of the authenticating system and a codified challenge generated by authenticating system are embedded in said 2D-code;
   processing means in said mobile device for processing said codified challenge and computing a response to the challenge using a personal secret, the response to the challenge is computed using a digital signature algorithm according to an Identity Based Encryption scheme; wherein said personal secret is a string of characters univocally related to a user identifier (user ID) of said user of the mobile device and to a time stamp;
   communication means between said mobile device and the authenticating system configured to, upon computing said response, send a message to the authenticating system, said message including a tuple whose elements are at least said user identifier, said challenge and said response to the challenge;
   processing means in the authenticating system configured to analyze said elements of the tuple and determining the tuple is a valid tuple when the response to the challenge has been generated using the personal secret of the user whose user identifier is in the tuple for a given period of time, and in case said tuple is valid the processing means are configured to;
   check in a users list stored in the authenticating system if the user identifier in the tuple is in said users list, and if the user identifier is in the users list the processing means are configured to;
   verify if the challenge in the tuple is in a session list stored in the authenticating system, and if the challenge is in the session list;
   the authenticating system is configured to push a welcome screen to the client computer that corresponds to a session identification number in the session list where the challenge is.

9. System according to claim 8, wherein said personal secret is stored in the mobile device and accessed upon entering a password.

10. System according to claim 8, wherein said personal secret is provided by a trusted server, which is configured to compute said personal secret using a master secret and said user identifier and said time stamp.

11. System according to claim 8, wherein said 2D-code reader is a camera.

* * * * *